United States Patent Office 3,829,480
Patented Aug. 13, 1974

3,829,480
METHOD OF OXIDATION OF ALKYLDIHALOGEN-PHOSPHINES TO THEIR OXIDES
Edward B. Trescott, 627 Forge Road, Whitemarsh, Md. 21162, and James C. Richards, 160 Alpine Trail, Sparta, N.J. 07871
No Drawing. Original application Feb. 4, 1970, Ser. No. 8,693, now abandoned. Divided and this application Apr. 27, 1972, Ser. No. 248,144
Int. Cl. C07f 9/38, 9/42
U.S. Cl. 260—543 P          4 Claims

ABSTRACT OF THE DISCLOSURE

A recycle method for oxidizing alkyldihalogenphosphines to their oxides by the reaction,

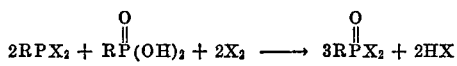

wherein the oxygen donor is prepared by the reaction,

wherein R is any alkyl group and X is any halide.

---

This is a division of application Ser. No. 8,693 filed Feb. 4, 1970 and now abandoned.

DEDICATORY CLAUSE

The invention described herein may be manufactured, used, and licensed by or for the government for governmental purposes without the payment to us of any royalty thereon.

SPECIFICATION

Our invention relates to a recycle method of oxidation of alkyldihalogenphosphines to their oxides according to the reaction,

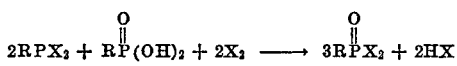

wherein the oxygen donor is prepared by the reaction,

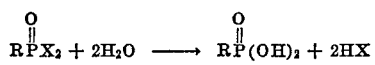

wherein R is any alkyl group and X is any halide; the oxides produced by our new method having utility as intermediates in industry such as insecticides, pesticides, plasticizers, fuel additives and others using phosphorus esters.

Prior art techniques for oxidizing alkyldihalogenphosphines to their oxides were a direct oxidation method as set forth in the reaction,

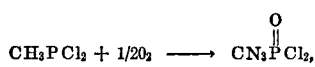

a modified direct oxidation method as aforementioned but utilizing high pressure to carry out the oxidation process, and a method using pyro phosphate produced from dimethyl-hydrogen phosphite to oxidize the alkyldihalogenphosphine. The direct oxidation method presented several problems such as requiring pure alkyldihalogenphosphine as a starting material, high operating costs, and an explosion hazard during the process operation. While the modified direct oxidation method was considerably safer, high pressure equipment was required to carry out the process which rendered the technique expensive. The modified direct oxidation process also required utilizing pure alkyldihalogenphosphine. Alkyldihalogenphosphines are made by a high temperature methanization from phosphorus trihalide, and attempts to carry this conversion above approximately 20 percent have not been successful. The product of the high temperature methanization is a mixture of approximately 20 percent alkyldihalogenphosphine and 80 percent of phosphorus trihalide, and this mixture must be separated before oxidation is carried out. The separation of the alkyldihalogenphosphine and the phosphorus trihalide is accomplished by a distillation process which requires numerous stages, because the materials to be separated are similar and the boiling point spread is small. Such distillation requires equipment that is expensive, and the oxidation process involves a high capital investment. The pyro oxidation process presented the problem that methanol was required as a starting material. Methyl chloride was produced as a by-product, and this led to the process being hazardous due to the possibility of explosion. Our invention was conceived and reduced to practice to overcome the aforementioned prior art problems and to satisfy the long felt need for an economical, effective, efficient, and safe method for oxidation of alkyldihalogenphosphines to their oxides for use as intermediates in the manufacture of materials such as insecticides, pesticides, and plasticizers.

A principal object of our invention is to provide a method for oxidizing alkyldihalogenphosphines to their oxides which is economical to operate.

Another object of our invention is to provide a method of oxidizing alkyldihalogenphosphines to their oxides which eliminates safety hazards and is simple to operate.

Other objects of our invention will be obvious or will appear from the specification hereinafter set forth.

While any alkyldihalogenphosphine can be oxidized to the oxide by our generic process according to the reaction,

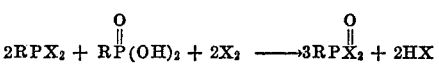

wherein the oxygen donor is prepared by the reaction,

wherein R is any alkyl group and X is any halide; the preferred embodiment of our new method is according to the following reaction,

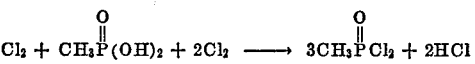

wherein the oxygen donor is prepared by the reaction,

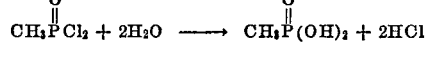

If desired, phosphorus trihalide can be used as a reaction media for the oxidation step, and the phosphorus trichloride can be recycled.

The hydrogen halide product can be removed by any conventional method such as carrying out the reaction under reduced pressure, partial hydrolysis of the dihalide to eliminate the requirement for hydrogen halide separation, reacting at or near the atmospheric boiling point of hydrogen halide to strip off the hydrogen halide, or reacting in the presence of a base or acid separator. A significant advantage of our new process is that it can be installed where an existing pyro oxidation process, as previously described, is in operation. Our process can be utilized either for laboratory scale operation or for bulk production, and quantities are adjustable within the skill of the art.

In our method of oxidizing alkyldihalogenphosphines to an oxide by a recycle process, the process uses the product of the oxidation (alkyldihalogenphosphine oxide) after hydrolysis as an oxygen donor. The hydrolysis product is subsequently reacted with alkyldihalogenphosphine and halogen to provide additional alkyldihalogenphosphine oxide, a portion of which is recycled. The oxide can be converted to the ester by conventional esterification technique.

We wish it to be understood that we do not desire to be limited to the exact details shown and described in the specification for obvious modifications will occur to a person skilled in the art.

We claim:
1. A method for producing an alkyldihalogenphosphine oxide which comprises the steps of:

reacting an alkyldihalogenphosphine, $RPX_2$, with an alkylphosphonic acid, $$R\overset{O}{\underset{\|}{P}}-(OH)_2,$$

and elemental halogen, $X_2$, wherein R is an alkyl group and X is halogen, to produce the alkyldihalogenphosphine oxide according to the following reaction (1) $$2RPX_2 + R\overset{O}{\underset{\|}{P}}-(OH)_2 + 2X_2 \longrightarrow 3R\overset{O}{\underset{\|}{P}}X_2 + 2HX;$$

hydrolyzing a portion of the alkyldihalogenphosphine oxide, thus produced, to form an alkylphosphonic acid according to the reaction, (2) $$R\overset{O}{\underset{\|}{P}}X_2 + 2H_2O \longrightarrow R\overset{O}{\underset{\|}{P}}-(OH)_2 + 2HX,$$

and reacting the regenerated alkylphosphonic acid thus produced to react with further alkyldihalogenphosphine and elemental halogen to form an additional quantity of alkyldihalogenphosphine oxide in accordance with said reaction (1);

and repeating said reactions (2) and (1) in that order to produce additional quantities of alkyldihalogenphosphine oxide.

2. The method according to claim 1 wherein the alkyl groups in $$RPX_2, R\overset{O}{\underset{\|}{P}}-(OH)_2 \text{ and } R\overset{O}{\underset{\|}{P}}X_2$$

are the same.
3. The method according to claim 2 wherein R is $CH_3$.
4. The method according to Claim 1, wherein X is chlorine.

References Cited

UNITED STATES PATENTS

| | | | |
|---|---|---|---|
| 3,584,043 | 6/1971 | Maier | 260—543 P |
| 2,365,466 | 12/1944 | Hamilton | 260—543 P |
| 2,482,810 | 9/1949 | Toy | 260—543 P |
| 2,683,168 | 7/1954 | Jensen et al. | 260—543 P |

FOREIGN PATENTS

| | | | |
|---|---|---|---|
| 1,139,491 | 11/1962 | Germany | 260—543 P |

OTHER REFERENCES

Kosolapoff, "Organophosphorus Compounds," 1950, pp. 58, 61 to 64 and 137 to 139, Q0412 P1K5.

Richard et al., "J. Am. Chem. Soc.," Vol. 83 (1961), pp. 1722 to 1726, Q01A5.

Houben-Weyl, "Methoden Der Organischen Chemie," 1963, Vierte Auflage, Dec. 1, pp. 339, 348, 387, 391 and 392.

JOSEPH E. EVANS, Primary Examiner

U.S. Cl. X.R.

260—502.4 R